United States Patent Office 3,507,898
Patented Apr. 21, 1970

3,507,898
HALOGENATED PHENYLALKOXYSILANES AS HIGH TEMPERATURE FIRE RESISTANT FLUIDS
Manuel A. Pino, Oakland, Calif., assignor to Chevron Research Company, San Francisco, Calif., a corporation of Delaware
No Drawing. Filed Jan. 15, 1968, Ser. No. 697,625
Int. Cl. C07f 7/04, 7/18
U.S. Cl. 260—448.8                    4 Claims

ABSTRACT OF THE DISCLOSURE

Thermally and hydrolytically stable hydraulic fluids are provided which are polyhalophenyl trialkoxysilanes, having aliphatic hydrocarbon groups of at least 5 carbon atoms.

BACKGROUND OF THE INVENTION

Field of the invention

Increasing demands in performance on aircraft and rockets have resulted in continuing efforts to provide improved hydraulic fluids. The wide gamut of properties necessary has made it extremely difficult to devise satisfactory hydraulic fluids. Not only must the hydraulic fluid have a good viscosity temperature relationship, that is, it should not be too thick at low temperatures or too thin at high temperatures, but it also should be thermally and hydrolytically stable. Since relatively large amounts of the fluid are used, the density of the fluid also becomes a limiting factor. Moreover, an acceptable material must not be too corrosive or it will cause failures of the hydraulic system.

While polyfluorosiloxanes have been reported as useful, see U.S. Patent No. 3,329,698, these materials are quite expensive and are not shown to have good hydrolytic stability.

Description of the prior art

Numerous patents have issued describing a variety of substituted siloxanes or other silicon derivatives for use as hydraulic fluids. See for example U.S. Patent Nos. 2,850,514, 2,876,209, 2,928,857, 3,290,248, 3,329,698 and 3,336,227. Also for a discussion on the effect of change in structure on hydrolytic stability of silyl esters see Peeler, Ind. Eng. Chem. 51, 749–52 (1959).

SUMMARY OF THE INVENTION

Polyhaloaryl trialkoxysilanes are provided as hydraulic fluids which are easily and inexpensively obtained from readily available chemicals. The alkyl groups are derived from primary alcohols of at least 5 carbon atoms. The halo atoms are of atomic No. 17 to 35, i.e. chlorine and bromine.

The hydraulic fluids are of low density, show good thermal and hydrolytic stability and low flammability. Moreover, the fluids show low corrosivity toward copper.

DESCRIPTION OF THE PREFERRED EMBODIMENTS

The hydraulic fluids of this invention will for the most part have the following formula:

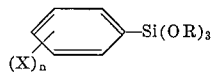

wherein X is halogen of atomic No. 17 to 35, the R's may be the same or different and are alkyl groups of from 5 to 12 carbon atoms, more usually of from 6 to 10 carbon atoms, having primary attachment to the oxygen. That is, the alkyl groups are derivable from primary alcohols. $n$ is a number of from 2 to 5, more usually averaging in a composition in the range of 2 to 5. That is, mixtures of compounds may be used where individual molecules have varying numbers of halogen. The halogens may be the same or different so that the same molecule may have one bromine and one chlorine or a multiple of one or both of the halogens.

R is illustrated by such alkyl groups as 2-ethylbutyl, hexyl, heptyl, octyl, isooctyl, 2-ethylheptyl, decyl, 2,4-dimethylhexyl, dodecyl, etc., the 1- being understood as to the place of attachment.

Illustrative compounds include dichlorophenyl tris-2-methylpentoxysilane, trichlorophenyl tris - octoxysilane, pentachlorophenyl tris - heptoxysilane, chlorodibromophenyl tris-2-ethylbutoxysilane, dibromodichlorophenyl tris-nonoxysilane, etc.

For use as hydraulic fluids, it is often desirable to employ additives to the compositions of this invention which will improve specific properties or stabilize the compositions against oxidation or aid in prevention of corrosion with regard to certain metals.

Sebacate esters are added to swell rubber connections and seals in the hydraulic system. Viscosity index improvers may be added as necessary. Other additives which may be employed are oxidation inhibitors, corrosion inhibitors and snuffers to reduce inflammability.

The compositions of this invention are readily prepared by halogenating phenyltrichlorosilane with the desired halogen. Chlorination may be carried out according to the procedure described by A. Ya. Yakubovich et al., Zhur. Ob. Khim, 26, 568–76 (1956). Bromination can be carried out according to the procedure described in "Journal of General Chemistry, U.S.S.R.," 23, 421–25 (1953). The resulting halogenated phenyltrichlorosilanes may then be combined with the desired alcohol in the presence of a tertiary base, e.g., pyridine, in solution in an inert solvent and the mixture heated until the reaction is complete. The product may then be isolated by conventional means.

Examples

The following examples are offered by way of illustration and not by way of limitation.

Example I (A) Into a tared 2-liter flask fitted with stirrer, bubbler, thermometer and reflux condenser was charged 660.9 g. of phenyltrichlorosilane and 3.30 g. of iron powder. Chlorine was bubbled through the flask, the temperature rapidly rising to 70° C. This temperature was maintained for somewhat less than 3 hours, until the weight of the reactants increased 308.7 g. (This indicates an uptake of about 2.9 chlorines per molecule.) The mixture was isolated and distilled at 7 mm. Hg, a middle cut being obtained which weighed 420.6 g. and had an average density at 20° C. of 1.575 g./cc. According to the relationship set forth by Adrianov et al., Izvest. Akad. Nauk S.S.R. Otdl Khim. Nauk, 1956, 457–460, this density indicates approximately 3.3 chlorine atoms per ring. (Where a chlorine analysis is not indicated, the number of halogens is determined from the density according to the indicated density/halogen relationship.)

(B) Into a 2-liter reaction flask was charged 162.6 g. of the product prepared above and 412 ml. of dry toluene. The mixture was cooled to 0–5° C. and a mixture of 183.9 g. of 2-ethylbutanol and 163 g. of dry pyridine was added dropwise, the temperature being maintained between 0° and 20° C. During the addition of the 2-ethylbutanol and pyridine, an additional 200 ml. of toluene was added to the reaction mixture to help stirring. When the addition was complete, the mixture was stirred for an additional 30 minutes and then heated to reflux and maintained at reflux for 40 minutes. After cooling, the reaction mixture was filtered and the solvent stripped. The product was then distilled in vacuo at 0.5 mm. Hg to a bottoms temperature of 150° C.

*Analysis.*—Percent chlorine=16.9; density at 20° C. of 1.0507 g./cc.

Example II (A) Into a 2-liter flask fitted with thermometer, stirrer, dropping funnel and condenser and painted black to exclude light, was charged 1,251.3 g. of phenyltrichlorosilane and 6.25 g. of iron powder. Over a 2-hour period, 1,725 g. of bromine was added while maintaining the temperature from about 45° to 50° C. When the addition was completed, the mixture was heated to 90–100° C. and stirred for one hour and then allowed to cool.

The product was then distilled at 0.5 mm. Hg, the material boiling from about 120° to 130° C. being taken as product. The product weighed 1,058.4 g. and had a density at 20° C. of 1.9753 g./cc., indicating 2 bromines per molecule.

(B) Into a reaction flask was introduced 184.7 g. of the trichlorosilane prepared above and 380 ml. of toluene and the mixture cooled to below 5° C. The dropwise addition was then begun of a mixture of dry 98.45 g. of 2-ethylbutanol, 80.55 g. of n-hexyl alcohol and 158 g. of pyridine. The temperature was maintained below 15° C. during the addition. At the end of the addition, the mixture was stirred for 20 minutes and then heated to reflux for 60 minutes. After cooling, the mixture was filtered.

The solvent was stripped under nitrogen on a steam plate and the pressure then reduced to 0.3 mm. Hg and the temperature raised to 175° C. to remove any excess alcohol. To the residue was then added 5% by weight of Darco charcoal and copper powder and the mixture heated for 15 minutes at 100° C., followed by filtration through Celite. The product had a density at 20° C. of 1.1987 g./cc. and a viscosity at 100° F. of 12.30 cs. and at 210° F. of 2.889 cs.

A number of compositions were prepared as described above, the following table recapitulating the properties of the products described above as well as the properties of the other products.

Thermal stability test.—A 10 cc. sample of the fluid to be tested is placed in a 25 cc. glass ampoule along with a 1″ steel wire specimen having a diameter of about 1/32″. The ampoule is sealed under vacuum and heated in an oven to 400° F. for 40 hours. It is then cooled and opened and the appearance of the fluid and metal noted. The viscosity is measured and the viscosity change due to the heating is noted.

Hydrolytic stability.—A 10 g. sample of the material to be tested and 0.20 g. of water are placed in a Parr bomb. A small copper strip with a surface area of 6.7 cm.² is added to the bomb. After closing, the bomb is heated to 400° F. for 20 hours. After the bomb has cooled, it is opened and the viscosity of the fluid is measured. Also, the change in appearance of the copper strip is noted.

Spontaneous ignition temperature.—ASTM D-286-30.

Two microflammability tests are also employed: micro flash point and wick flammability. A description of these tests can be found in ASTM Special Technical Bulletin No. 406 (1966) in an article by D. E. Johnson and N. W. Furby entitled, "Miniaturized Tests for Fire Resistance of Hydraulic Fluids," pages 135–149.

In the micro flash point test, a small sample of the fluid to be tested is placed in a small pan which can be heated electrically. Above the surface of the liquid is a spark plug for igniting the fluid when the flash point has been reached. The micro flash unit produces flash temperatures approximately 20° F. higher than those obtained by the Cleveland Open Cup method.

In the wick flammability test, a pipe cleaner is fastened to a windshield wiper motor so that it passes in a horizontal plane in and out of a flame from a laboratory burner. The windshield wiper motor is adjusted to a speed of 30–40 cycles per minute. The pipe cleaner is soaked in the test fluid and the excess is allowed to drain off. The burner is adjusted to provide a nonluminous flame of about 4″ height without a sharp inner cone. The pipe cleaner is cycled through the hottest part of the flame and the number of cycles until a self-sustaining flame is noted. In addition, a figure giving a numerical rating for the type of flame is also noted. The rating

TABLE I

| Example | Compound | Density, 20° C., g./cc. | $V_{100}$ cs. | $V_{210}$ cs. | V.I. |
|---|---|---|---|---|---|
| I | Tri- and tetra-(~3.3) chloro tri-(2-ethylbutoxy)silane. | 1.0507 | 15.62 | 3.39 | 96 |
| II | Dibromophenyl tri-([.45]n-hexyloxy) ([.55]2-ethylbutoxy)-silane. | 1.1987 | 12.30 | 2.89 | 90 |
| III | Dibromophenyl tri-(2-ethylbutoxy)silane | 1.2072 | 14.96 | 3.25 | 90 |
| IV | Tri- and tetra-(3.3) chlorophenyltri-(2-ethyl butoxy)-silane. | 1.0442 | 15.04 | 3.33 | 101 |
| V | Dibromophenyl tri-([.45]n-hexyloxy) ([.55]2-ethylbutoxy)-silane. | 1.2035 | 13.45 | 3.04 | 88 |
| VI | Di- and tri-(2.5)chlorophenyl tri-([.45]n-hexyloxy) ([.55]2-ethylbutoxy)silane. | 1.0264 | 11.61 | 2.77 | 86 |

The products prepared above were tested in a variety of tests to determine their thermal and hydrolytic stability, their flammability as well as other properties which are important to the acceptability of a hydraulic fluid which may find use under extremely severe conditions. The following is a description of the various tests employed.

scale is as follows: (1) no ignition; (2) self-extinguishing after ignition; (3) burns quietly; (4) sheds drops of burning material; (5) burns violently.

The following table indicates the properties of a number of exemplary materials of this invention, as determined by the above described tests.

TABLE II

| | | Thermal stability test | | | | Hydrolytic stability test | | | | Flammability test | |
|---|---|---|---|---|---|---|---|---|---|---|---|
| Ex. | Spontaneous ignition temp.,° F. | Fluid appearance | Metal appearance | Percent visc. change 100° F. | Percent visc. change 210° F. | Cu strip wt. change, mg./cm.² | Rating ASTM D 131 | Percent visc. change 100° F. | Percent visc. change 210° F. | Micro flash, ° F. | Pipe wick |
| I | 720 | Opaque-dk. brn. | Black | −16.7 | −1.3 | 2.08 | Brown | +19.0 | −9 | | 38–3; 43–3 |
| II | 700 | Clear-pale yel. | Blue-black | −0.2 | +0.2 | −0.025 | 1b | +38 | −1.3 | 550 | 58–3 |
| III | 675 | Clear-lt- straw | Black | −1.3 | −0.2 | −0.03 | 2b | +31.2 | −5.4 | | 28–2; 23–4 |
| IV | | Straw | Brown | −0.8 | +0.7 | 0.0 | 1b | +32 | −3.7 | 500 | 22–3 |
| V | | Lt. straw | Gray-bronze | −0.7 | −0.1 | 0.0 | 1b | +38 | −0.8 | | |
| VI | | Lt. yellow | Lt. brn.-gray | −0.4 | +1.9 | −0.01 | 1b | +8.3 | −2.5 | | |

It is evident from the above results, that the compositions of this invention have a wide range of properties which are useful for hydraulic fluids. The materials are of low density so as to minimize the increase in weight which must be carried in hydraulic systems. The fluids have a wide range of useful viscosities so as not to be too thick at low temperatures or too thin at high temperatures. Moreover, they have good thermal and hydrolytic stability, as well as low flammability.

I claim:
1. A compound of the formula:

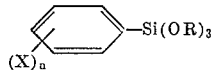

wherein X is halogen of atomic No. 17 to 35, $n$ is in the range of 2 to 5 and R is an alkyl group of from 5 to 12 carbon atoms having primary attachment to oxygen.

2. A compound according to claim 1 wherein X is chlorine and R is 2-ethylbutyl.

3. A compound according to claim 1 wherein X is bromine and R is 2-ethylbutyl.

4. A compound according to claim 1 wherein R is a mixture of 2-ethylbutyl and n-hexyl.

References Cited

UNITED STATES PATENTS

| | | | |
|---|---|---|---|
| 2,891,981 | 6/1959 | Gainer et al. | 260—448.2 |
| 2,947,772 | 8/1960 | Eynon et al. | 260—448.8 |
| 2,995,590 | 8/1961 | Peeler et al. | 260—448.8 |
| 3,061,467 | 10/1962 | Vincent | 260—448.8 XR |
| 3,122,580 | 2/1964 | Ryan | 260—448.8 |
| 3,291,742 | 12/1966 | Millward | 260—448.8 XR |
| 3,328,450 | 6/1967 | Plueddemann | 260—448.8 |

TOBIAS E. LEVOW, Primary Examiner

P. F. SHAVER, Assistant Examiner

U.S. Cl. X.R.

252—78